J. L. Asay
Attaching Teeth to Plates.
No. 62,918.  Patented Mar. 19, 1867.

Witnesses
Chas. E. Foster
C. Howson

Inventor
Henry Howson
Atty for J. L. Asay

United States Patent Office.

J. LAMBERT ASAY, OF PHILADELPHIA, PENNSYLVANIA.

Letters Patent No. 62,918, dated March 19, 1867.

IMPROVEMENT IN STAPLES FOR ARTIFICIAL TEETH.

*The Schedule referred to in these Letters Patent and making part of the same.*

TO ALL WHOM IT MAY CONCERN:

Be it known that I, J. LAMBERT ASAY, of Philadelphia, Pennsylvania, have invented an Improvement in Artificial Teeth; and I do hereby declare the following to be a full, clear, and exact description of the same, reference being had to the accompanying drawing, and to the letters of reference marked thereon.

My invention consists in the use of staples with their bent ends projecting from artificial teeth as a means of firmly securing the latter to vulcanizable gum plates or to vulcanizable gum attached to metal plates, in the manner fully described hereafter.

In order to enable others to make and use my invention, I will now proceed to describe its construction and operation. On reference to the accompanying drawing, which forms a part of this specification—

Figure 1:

Figure 1 represents the inside of a block of teeth with my improvement.

Figure 2:
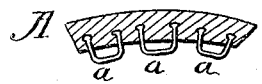

Figure 2, a sectional plan on the line 1 2, fig. 1; and

Figure 3:

Figure 3, a modification of my improvement.

A represents a block of three teeth, to which are connected three staples $a\,a\,a$, made of platina or other wire capable of resisting the effects of heat, the form of the staples being shown in fig. 2. Heads or notches are formed on the two ends of the wire which compose each staple, and these heads are embedded in the material of which the teeth are formed while the said material is in a plastic state and is being reduced to the desired shape by the ordinary moulds or otherwise, so that when the teeth are properly baked the heads will render the withdrawal of the staples, without breaking the teeth, impossible. It will be seen that the staples project beyond the rear of the teeth so that the gum, while still in a plastic state and prior to the vulcanizing of the same, may be forced between the rear of the teeth and the bent portion of the staples, the projecting portions of the latter being thus thoroughly embedded in the gum. After the latter has been vulcanized by the usual process, and thereby reduced to the well-known tough and hard state, it will be impossible to detach the teeth from the gum plate without tearing and disintegrating the latter or breaking the staples, the projecting portions of which are embedded in, surrounded, and held by the vulcanized gum.

The superiority of the staples as a mode of securing the teeth to the gum plate over the ordinary-headed pins or bent wires will be evident without further description.

In some cases the staples may be attached to the teeth in the manner shown in fig. 3; in fact, the disposal and the number of staples used will in a great measure depend upon the form and size of the teeth or the extent of the block.

I do not claim, broadly, combining metallic staples with artificial teeth, as such a combination is described in the patent of Daniel Harrington, granted December 10, 1840, who, however, embedded the bent portion of the staples in the teeth instead of allowing them to project therefrom, as in my improvements.

I claim as my invention, and desire to secure by Letters Patent—

The use of staples $a$, with their bent portions projecting from the teeth, as a means of securing the latter to a vulcanizable gum plate or to vulcanizable gum attached to a metal plate, as and for the purpose herein set forth.

In testimony whereof I have signed my name to this specification in the presence of two subscribing witnesses.

J. LAMBERT ASAY.

Witnesses:
 HENRY HOWSON,
 JOHN THOMPSON.